3,085,995
PROCESS FOR PREPARING POLYMERS OF VINYL PHOSPHORUS MONOMERIC COMPOUNDS

Christopher Nigel Kenney, Northwich, England, assignor to Imperial Chemical Industries Limited, London, England, a corporation of Great Britain
No Drawing. Filed June 11, 1959, Ser. No. 819,555
Claims priority, application Great Britain June 20, 1958
3 Claims. (Cl. 260—80)

This invention relates to new polymeric phosphorus compounds and their preparation, particularly to polymers derived from the trivinyl phosphine group useful as ligands for forming complex compounds with metals or their salts, thus providing means of extracting these metals or their salts from solutions.

Monomeric and polymeric compounds containing alkyl groups or alkyloxy groups attached to P=O radicals, for example triethyl phosphine oxide $(Et)_3P=O$, triethyl phosphate $(EtO)_3P=O$, have been extensively studied as means of extracting uranium salts from solutions. It was considered that replacement of alkyl groups by polymerised vinyl groups might provide polymeric ligands suitable for coordination with metals. Following this line of thought we have found that by reacting a vinyl Grignard compound with phosphorus oxychloride polymeric materials which posses useful ligand properties surprisingly are formed spontaneously.

According to our invention we provide as new compositions of matter polymers composed of phosphorus, carbon, hydrogen and oxygen, as hereinafter defined; we also provide a process for making these polymers by reacting phosphorus oxychloride with a vinyl Grignard compound.

Another feature of our invention is the use of these polymeric materials as means of separating certain metals or their salts from solutions.

We are for the present unable to say with certainty what the compositions and structures of the polymeric materials of our invention are, but as regards composition they contain from 14 to 20% of phosphorus, from 30 to 60% of carbon and from 4 to 9% of hydrogen, the remainder being oxygen; whilst as regards structure some at least of them are believed to possess the general formula

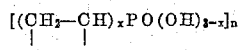

The numerical value of $x$ in this general formula is believed to be determined mainly by the amount of phosphorus oxychloride relative to that of the vinyl Grignard compound. Thus an excess of vinyl Grignard compound will result in a polymer consisting essentially of

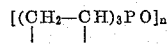

whilst with smaller relative proportions of the vinyl Grignard compound the polymers

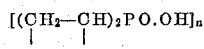

and

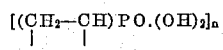

will be formed after hydrolysis of the unreacted chlorine atoms of the phosphorus oxychloride, and the final product may contain all three species. Other factors that influence the value of $x$ are the time of reaction and the temperature, for example the longer the reaction mixture is refluxed, or the higher the temperature of the initial reaction, the greater, so it is believed, is the proportion of the polymer

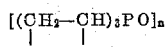

The reaction between phosphorus oxychloride and a vinyl Grignard compound may be carried out at room temperature, or at lower temperatures for example at $-20°$ C. A convenient reaction solvent medium is tetrahydrofuran and after the reaction proper is over the reaction mixture may be refluxed if desired. The reaction may be carried out in the presence of air or oxygen or in the absence of the latter. Suitable vinyl Grignard compounds are vinyl magnesium bromide and vinyl magnesium chloride.

The solid polymers obtained by the reaction are insoluble in water, organic solvents, acids and bases and are infusible. Refluxing the polymers with vinyl monomers, for example styrene or divinyl benzene in the presence of a free-radical initiator, for example isopropyl azodiisobutyrate, leads to products of improved physical strength though of possibly slightly reduced uranium capacity.

In a typical experiment to illustrate the property of extracting metals from solutions of their salts, one gramme of polymer, when shaken for twenty minutes with 1 litre of a neutral solution of uranyl nitrate containing 1.0 g. of $UO_2(NO_3)_2.6H_2O$ per litre, or with 1 litre of a similar solution made up in 0.2 N nitric acid, was found to extract 0.10 g. of uranium. This uranium could subsequently be removed by shaking the polymer with 0.2 N sodium carbonate solution.

The following examples illustrate the process of making these polymeric materials.

Example 1

A vinyl Grignard compound was prepared by first stirring 14.6 g. of magnesium turnings with 100 ml. of tetrahydrofuran, which had been dried over calcium chloride and lithium aluminium hydride, in a one-litre three-necked flask fitted with a stirrer, a dropping funnel, and a condenser cooled with a solid carbon dioxide-ethyl alcohol mixture. One or two crystals of resublimed iodine were added, and then a solution of 45 ml. (60 g.) of vinyl bromide in 125 ml. dry tetrahydrofuran was added from the dropping funnel at such a rate that the contents of the flask refluxed gently. After the addition of the vinyl bromide, a further 100 ml. of tetrahydrofuran were added and the contents refluxed gently for one hour. The flask was then allowed to cool thoroughly.

To the solution of the vinyl Grignard compound were slowly added 12 ml. (20 g.) of freshly distilled phosphorus oxychloride mixed with 50 ml. of tetrahydrofuran. A reaction immediately occurred and a yellowish solid separated out. If desired, the reaction mixture may be cooled at this stage in an ice bath or a salt/ice bath. After all the phosphorus oxychloride had been added the flask contents were refluxed for an hour.

After cooling, 200 ml. of saturated aqueous ammonium chloride were added to the flask to hydrolyse the reaction mixture and the contents were stirred overnight. The following morning 450 ml. of dilute hydrochloric acid were added to dissolve any precipitated magnesium halide, and the contents were stirred for a further two hours and then filtered under vacuum to give, after washing with alcohol and drying under vacuum, 25.5 g. of a pale yellow solid containing 14.7% phosphorus.

Example 2

1.0 g. molecule of vinyl magnesium chloride in 1200 ml. of dry tetrahydrofuran was placed in a 2-litre three-necked flask. To this was slowly added 34 g. of phosphorus oxychloride in 60 ml. of tetrahydrofuran. After the addition of about three-quarters of the phosphorus oxychloride, a yellow brown solid separated. The final gelatinous mass was treated with 200 ml. of saturated ammonium chloride to hydrolyse the reaction mixture, filtered, and washed with hot hydrochloric acid, water and acetone. The product contained 19.1% phosphorus.

*Example 3*

A vinyl Grignard compound was prepared as in Example 1 from 14.7 g. magnesium, 60 g. vinyl bromide and 300 ml. of dry tetrahydrofuran. To this solution was added 75 ml. dry benzene containing 20 g. phosphorus oxychloride, 8 g. styrene, 2.0 isopropyl azodiisobutyrate, followed by a further 25 ml. benzene. The mixture was refluxed for 3 hours and cooled. After hydrolysis with 250 ml. saturated ammonium chloride solution, followed with 500 ml. of water, it was stirred for 1½ hours. The solid product was then filtered, boiled with 500 ml. of 50% HCl, washed with water, ethanol and ether, and dried in a desiccator over calcium chloride.

19.5 g. of product was obtained containing 17.3% phosphorus, 48.0% carbon, and 7.5% hydrogen.

What I claim is:

1. A process for making phosphours containing polymers comprising adding phosphorus oxychloride to a vinyl Grignard compound having the formula

in which X is a halogen and then hydrolyzing the resultant polymer.

2. A process for making polymers as set forth in claim 1 in which the vinyl Grignard compound is selected from the group consisting of vinyl magnesium chloride and vinyl magnesium bromide, the reaction between vinyl Grignard compound and phosphorus oxychloride being carried out at room temperature.

3. A process as set forth in claim 1 in which the Grignard compound, and the phosphorus oxychloride are combined by adding the phosphorus oxychloride to the vinyl Grignard compound.

References Cited in the file of this patent

UNITED STATES PATENTS 2,439,214    Lindsey    Apr. 6, 1948
2,492,994    Harman et al.    Jan. 3, 1950

OTHER REFERENCES

Kosolapoff: Journal American Chemical Society, vol. 67, pages 1180–2 (1949).

"Organophosphorus Compounds" (Kosolapoff), John Wiley & Sons, Inc., New York (1950), pages 107 and 149 relied on.

Normant: Compt. Rend., 239, page 1510 (1954).